United States Patent
Yu et al.

(10) Patent No.: US 10,506,512 B2
(45) Date of Patent: Dec. 10, 2019

(54) USER EQUIPMENT BATTERY SAVING IN A HETNET DEPLOYMENT WITH EICIC

(75) Inventors: Yi Yu, Reston, VA (US); Yi Song, Plano, TX (US); Zhijun Cai, Euless, TX (US); Mo-han Fong, Ontario (CA); Takashi Suzuki, Ichikawa (JP)

(73) Assignee: BlackBerry Limited, Waterloo, Ontario (CA)

(*) Notice: Subject to any disclaimer, the term of this patent is extended or adjusted under 35 U.S.C. 154(b) by 1795 days.

(21) Appl. No.: 13/984,637

(22) PCT Filed: Feb. 11, 2011

(86) PCT No.: PCT/US2011/024537
§ 371 (c)(1),
(2), (4) Date: Dec. 12, 2013

(87) PCT Pub. No.: WO2012/108876
PCT Pub. Date: Aug. 16, 2012

(65) Prior Publication Data
US 2018/0324693 A1    Nov. 8, 2018

(51) Int. Cl.
*H04W 52/02* (2009.01)
*H04W 76/27* (2018.01)
(Continued)

(52) U.S. Cl.
CPC ... *H04W 52/0216* (2013.01); *H04W 52/0229* (2013.01); *H04W 52/0261* (2013.01);
(Continued)

(58) Field of Classification Search
CPC ............ H04W 52/0216; H04W 76/28; H04W 52/0229; H04W 76/27; H04W 52/0261;
(Continued)

(56) References Cited

U.S. PATENT DOCUMENTS

| 2008/0196892 A1 | 8/2008 | Damnjanovic |
| 2009/0073907 A1* | 3/2009 | Cai ................... H04W 52/0216 370/311 |

(Continued)

FOREIGN PATENT DOCUMENTS

| WO | 2009/033253 | 3/2009 |
| WO | 2009/114802 | 9/2009 |

OTHER PUBLICATIONS

Office Action issued in related Chinese Application No. 201180070039.5 dated May 16, 2016.
(Continued)

*Primary Examiner* — Andrew Lai
*Assistant Examiner* — Harry H Kim
(74) *Attorney, Agent, or Firm* — Fish & Richardson P.C.

(57) ABSTRACT

Devices and methods are provided for reducing client node power consumption when monitoring first and second channels corresponding to first and second access nodes in a heterogeneous wireless-enabled communications environment. Enhanced Inter-Cell Interference Coordination (eI-CIC) operations are performed to mitigate interference between a first access node and a second access node. The client node monitors first and second channels corresponding to the first and second access nodes to detect the presence of Almost Blank Subframes (ABS) pattern data transmitted on the first channel. When detected, the client node ceases monitoring the first channel to reduce power consumption and thereby conserve battery resources.

20 Claims, 4 Drawing Sheets

(51) Int. Cl.
  H04W 76/28 (2018.01)
  H04W 72/12 (2009.01)
  H04W 72/04 (2009.01)

(52) U.S. Cl.
  CPC ....... *H04W 72/1205* (2013.01); *H04W 76/27* (2018.02); *H04W 76/28* (2018.02); *H04W 72/042* (2013.01); *Y02D 70/1222* (2018.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/24* (2018.01)

(58) Field of Classification Search
  CPC ............ H04W 72/1205; H04W 72/042; Y02D 70/146; Y02D 70/144; Y02D 70/142; Y02D 70/1224; Y02D 70/24; Y02D 70/1222; Y02D 70/164; Y02D 70/1262; Y02D 70/1264
  See application file for complete search history.

(56) References Cited

U.S. PATENT DOCUMENTS

| | | | |
|---|---|---|---|
| 2009/0232054 A1* | 9/2009 | Wang | H04W 52/0225 370/328 |
| 2011/0194428 A1* | 8/2011 | Wang | H04W 72/005 370/252 |
| 2012/0113812 A1 | 5/2012 | Ji et al. | |
| 2012/0113843 A1* | 5/2012 | Watfa | H04W 72/1289 370/252 |
| 2012/0147827 A1* | 6/2012 | Wu | H04L 1/1854 370/329 |
| 2013/0033998 A1 | 2/2013 | Seo et al. | |
| 2013/0114434 A1 | 5/2013 | Muruganathan et al. | |
| 2013/0223268 A1 | 8/2013 | Jung et al. | |
| 2013/0223393 A1* | 8/2013 | Jung | H04J 11/005 370/329 |
| 2013/0223409 A1 | 8/2013 | Jung et al. | |
| 2014/0254537 A1 | 9/2014 | Kim et al. | |

OTHER PUBLICATIONS

Reexamination Notification issued in Chinese Application No. 201180070039.5 dated Apr. 12, 2018, 12 pages.
ZTE, "Discussion on CRS Interference and CSI Measurements in Macro-Pico Deployment," 3GPP draft, R1-105969, Nov. 10, 2010; 4 pages.
Communication Pursuant to Article 94(3) EPC issued in European Application No. 11705128.4 dated Dec. 20, 2017; 5 pages.
Reexamination Notification issued in Chinese Application No. 201180070039.5 dated Dec. 27, 2017; 7 pages.
Communication under Rule 71(3) EPC issued in European Application No. 11705761.2 dated Dec. 9, 2014; 46 pages.
Office Action issued in U.S. Appl. No. 13/984,625 dated Jan. 22, 2015; 7 pages.
Office Action issued in Chinese Application No. 201180070038.0 dated Oct. 9, 2016.
Office Action issued in Chinese Application No. 201180070039.5 dated Nov. 28, 2016.
Office Action issued in Chinese Application No. 201180070038.0 dated Mar. 2, 2017.
Office Action issued in Chinese Application No. 201180070039.5 dated Mar. 6, 2017.
Communication Pursuant to Article 94(3) EPC issued in European Application No. 11705128.4 dated May 22, 2017.
International Search Report and Written Opinion of the International Searching Authority issued in International Application No. PCT/US2011/024555 dated Oct. 20, 2011; 11 pages.
International Search Report issued in International Application No. PCT/US2011/024537 dated Oct. 28, 2011; 13 pages.
Alcatel-Lucent; "Blank Subframes for LTE"; 3GPP TSG RAN WG1 Meeting #58 (R1-093340); Shenzhen, China; Aug. 24, 2009; 2 pages.
CATT; "Discussion on Measurement Restrictuion Requirement of eICI"; 3GPP TSG RAN Meeting #72 (R2-106534); Jacksonville, Florida; Nov. 15-19, 2010; 3 pages.
CMCC; "Considerations on Measurement Resource Restriction for eICIC"; 3GPP TSG-RAN WG2 Meeting #72 (R2-106381); Jacksonville, Florida; Nov. 15-19, 2010; 4 pages.
ETSI/MCC; "Report of 3GPP TSG RAN WG2 Meeting #72"; TSG-RAN Working Group 2 Meeting #72bis (R2-110679); Dublin, Ireland; Jan. 17-21, 2011; 166 pages.
Nokia; "Active Mode DRX"; 3GPP TSG-RAN WG2 Meeting #55 (R2-062752); Seoul, Korea; Oct. 9-13, 2006; 3 pages.
Renesas Electronics Europe; "Power Consumption and Other Practical Considerations for eICIC Measurement Requirements"; 3GPP TSG-RAN WG4 Meeting #57AH (R2-110340); Austin, Texas; Jan. 17-21, 2011; 7 pages.
Research in Motion UK Limited; "Measurement and Configuration for eICIC"; 3GPP TSG RAN WG2 Meeting #72 (R2-106622); Jacksonville, Florida; Nov. 15-19, 2010; 2 pages.
Research in Motion UK Limited; "UE Power Saving for eICIC"; 3GPP TSG RAN WG2 Meeting #73 (R2-111233); Taipei, Taiwan; Feb. 21-25, 2011; 3 pages.
Wigard, J. et al.; "On the User Performance of LTE UE Power Savings Schemes with Discontinuous Reception in LTE"; IEEE International Conference; Communications Workshops; Piscataway, New Jersey; Jun. 14, 2009; 5 pages.
ZTE; "Discussion on Measurement Restriction of eICIC"; 3GPP TSG-RAN WG2 Meeting #72 (R2-106332); Jacksonville, Florida; Nov. 15-19, 2010; 5 pages.
Canadian Office Action in Canadian Application No. 2,827,152, dated Mar. 13, 2015, 4 pages.
Canadian Office Action in Canadian Application No. 2,827,136, dated Mar. 13, 2015, 4 pages.
Communication Pursuant to Article 94(3) EPC issued in European Application No. 11705761.2 dated Jun. 19, 2014; 6 pages.
Office Action issued in related Chinese Application No. 201180070038.0 dated Mar. 28, 2016.
Office Action issued in related Taiwanese Application No. 101104445 dated Apr. 1, 2016.
Communication under Rule 71(3) EPC issued in European Application No. 11705128.4 dated Jul. 19, 2018, 43 pages.

* cited by examiner

US 10,506,512 B2

USER EQUIPMENT BATTERY SAVING IN A HETNET DEPLOYMENT WITH EICIC

CLAIM OF PRIORITY

This application is a U.S. National Stage of PCT/US2011/024537 filed on Feb. 11, 2011.

BACKGROUND OF THE INVENTION

Field of the Invention

The present invention is directed in general to communications systems and methods for operating same. In one aspect, the present invention relates to the devices and methods for reducing power consumption of a client node when performing channel monitoring operations within a heterogeneous wireless-enabled communications environment.

Description of the Related Art

Today's next generation cellular networks, such as those based on Third Generation Partnership Program (3GPP) Long Term Evolution (LTE)-Advanced (LTE-A), generally involve implementation of heterogeneous communication technologies. In these implementations, low power network nodes are typically placed to overlay traditional high-power Evolved Universal Terrestrial Radio Access Network (E-UTRAN) Node B (eNB) nodes to expand network coverage and to increase system capacity. Currently, two types of implementations have been discussed. The first is macro-pico, where a low-power picocell is accessible to all client nodes. The second is macro-femto, where a low power femtocell is only accessible by a predetermined group of client nodes having a closed subscription.

In these implementations, if a different carrier frequency is used for the pico/femtocell than that which is used for the macrocell, then it is referred to as a carrier aggregation (CA)-based heterogeneous implementation. Since a different frequency band is used for the pico/femtocell transmission and reception, client nodes using the pico/femtocell experience minimum interference from the macro eNB. Likewise, client nodes using the macro eNB experience minimum interference from the picofemto eNB. However, CA-based heterogeneous implementations require the acquisition of two separate radio frequency bands, which could prove to be inconvenient and costly. Accordingly, use of the same carrier transmission frequency for both macro and pico/femtocells, referred to as a non-CA-based heterogeneous implementation, is desirable for efficient use of radio resources.

For a non-CA-based heterogeneous implementation, the picocell, femtocell and macrocell share the same radio frequency spectrum to provide services to the client node. Full frequency reuse is possible in such implementations, which could maximize the system spectral efficiency. However, frequency reuse among picocells, femtocells and macrocells could cause strong inter-cell interference and degrade system performance. As a result, enhanced inter-cell interference coordination (eICIC) for non-CA-based implementations have been proposed as a work item in 3GPP to improve the interference condition of a heterogeneous network. Yet current implementations of eICIC incur additional processing operations that result in higher power consumption, which in turn reduces a client node's battery reserves. In view of the foregoing, it would be advantageous to conserve client node battery reserves when eICIC techniques are implemented in a non-CA-based implementation.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
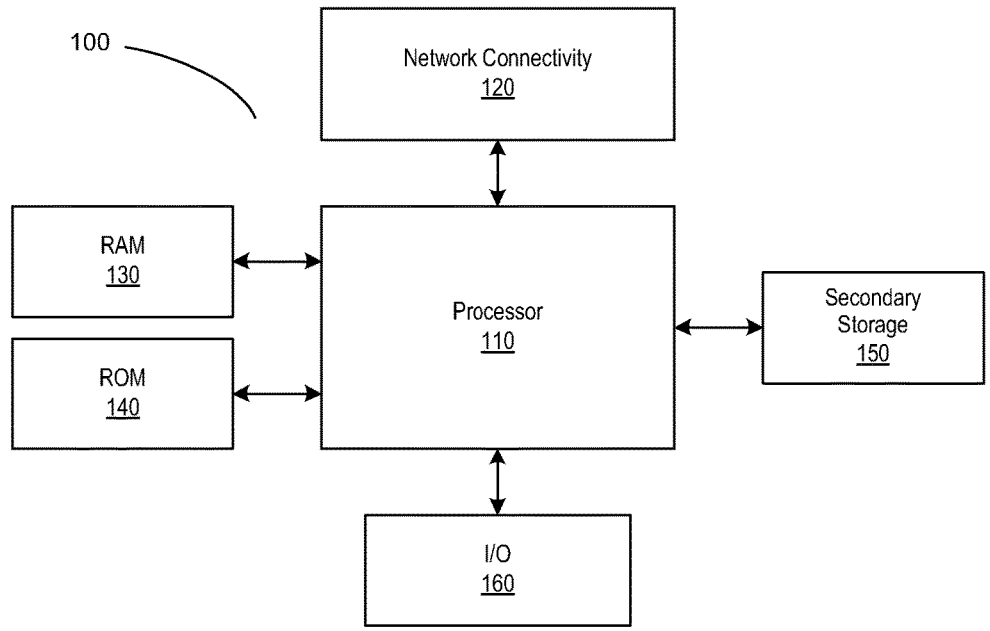
FIG. 1 depicts an exemplary system in which the present invention may be implemented.

Devices and methods are provided for reducing power consumption of a client node when performing channel monitoring operations within a heterogeneous wireless-enabled communications environment. In various embodiments, Enhanced Inter-Cell Interference Coordination (eICIC) operations are performed to mitigate interference between a first access node and a second access node. In these and other embodiments, a client node is notified with the scheduling option of the client node and may also be notified with the presence of Almost Blank Subframes (ABS) pattern data. When received, the client node ceases monitoring some of the subframes of the channel to reduce power consumption and thereby conserve battery resources. The client node may be notified with the scheduling option explicitly, for example, via the Radio Resource Control (RRC) signaling/Medium Access Control (MAC) Control Element (CE), or implicitly, for example, when the client node is notified with the ABS subframes or other restricted subframes such as measurement related restricted subframes, the client node may by default be assigned a pre-configured scheduling option.

In one embodiment, the first access node corresponds to a macrocell and the second access node corresponds to a picocell. In another embodiment, the first access node corresponds to a femtocell and the second access node corresponds to a macrocell. In one embodiment, the monitoring operations are scheduled to be performed only during the occurrence of ABS within the ABS pattern data. In another embodiment, the monitoring operations are scheduled to be performed only during the occurrence of non-ABS within the ABS pattern data. The non-ABS means the subframes that are not ABS. In yet another embodiment, the monitoring operations are scheduled to be performed both during the occurrence of ABS and during the occurrence of non-ABS within the ABS pattern data.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points.

Examples of Internet or Intranet nodes include host computers identified by an Internet Protocol (IP) address, bridges and WLAN access points. Likewise, examples of nodes in cellular communication include base stations, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PANs) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
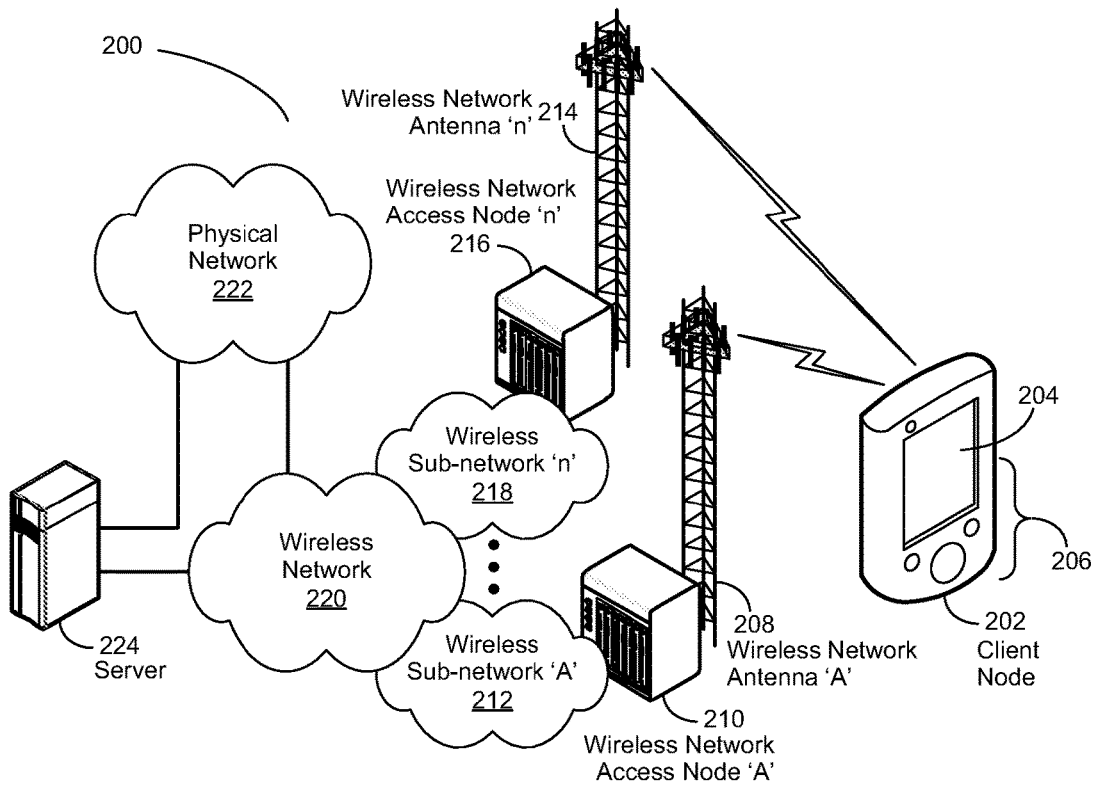
FIG. 2 shows a wireless communications system including an embodiment of a client node.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. The various applications may likewise be obtained from a peer client node 202 or other system over a connection to the wireless network 220 or any other wireless communication network or system. In various embodiments, the wireless network 220 comprises a plurality of wireless sub-networks (e.g., cells with corresponding coverage areas) 'A' 212 through 'n' 218. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204. Alternately, the client node 202 may access the wireless network 220 through a peer client node 202 acting as an intermediary, in a relay type or hop type of connection. Alternately, the client node 202 is tethered and obtains its data from a tethered device that is connected to the wireless network 212. Skilled practitioners of the art will recognize that many such embodiments are possible and the foregoing is not intended to limit the spirit, scope, or intention of the disclosure.

Figure 3:
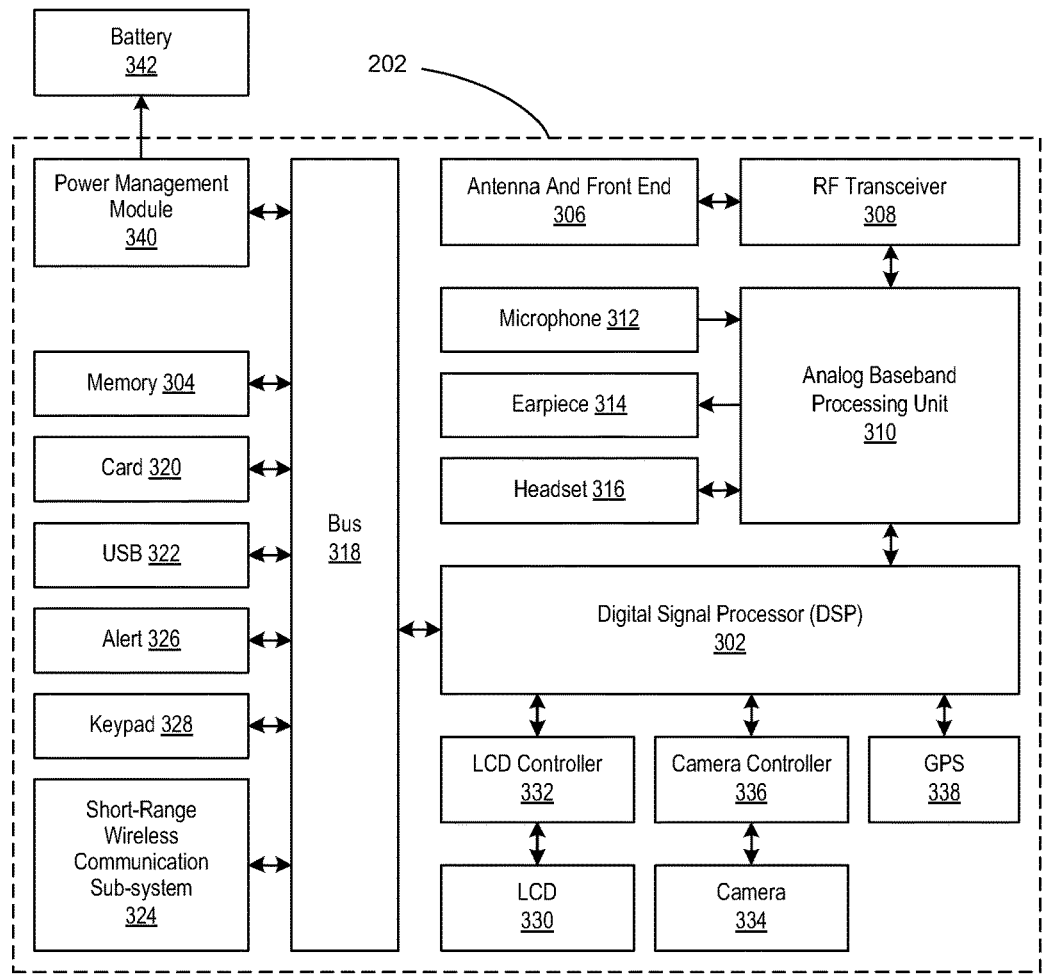
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the client node 202 to determine its position. The power management module 340 is operably coupled to a power storage unit (e.g., battery 342) and is operable to monitor the status of the battery and to distribute power from the battery 342 to various functional modules within the client node 202 using techniques known by those of skill in the art. Various other peripherals may also be included to provide additional functions, such as radio and television reception.

Figure 4:
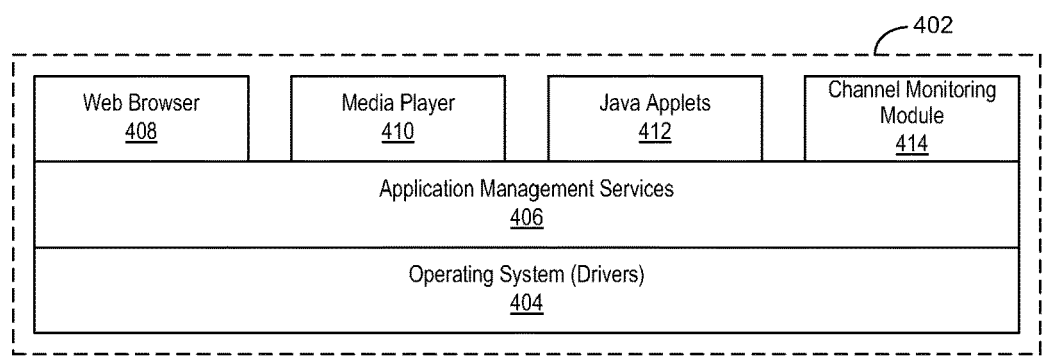
FIG. 4 is a simplified block diagram of a software environment that may be implemented by the DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. The channel monitoring module 414 is operable to control processing logic in the client node that is used to monitor various access node channels in a plurality of cells. In various embodiments described herein, the channel monitoring module 414 configures the client node 202 to temporarily cease channel monitoring operations on a predetermined transmission channel of a predetermined access node, as described in greater detail herein. The portion of the client node processing logic used to monitor the predetermined channel is temporarily powered-down and, therefore, power consumption of the client node's 202 power storage unit is reduced when the channel monitoring operations are ceased. In various embodiments, the client node 202, the wireless network nodes 'A' 210 through 'n' 216, and the server node 224 shown in FIG. 2 may likewise include a processing component that is capable of executing instructions related to the actions described above.

Figure 5:
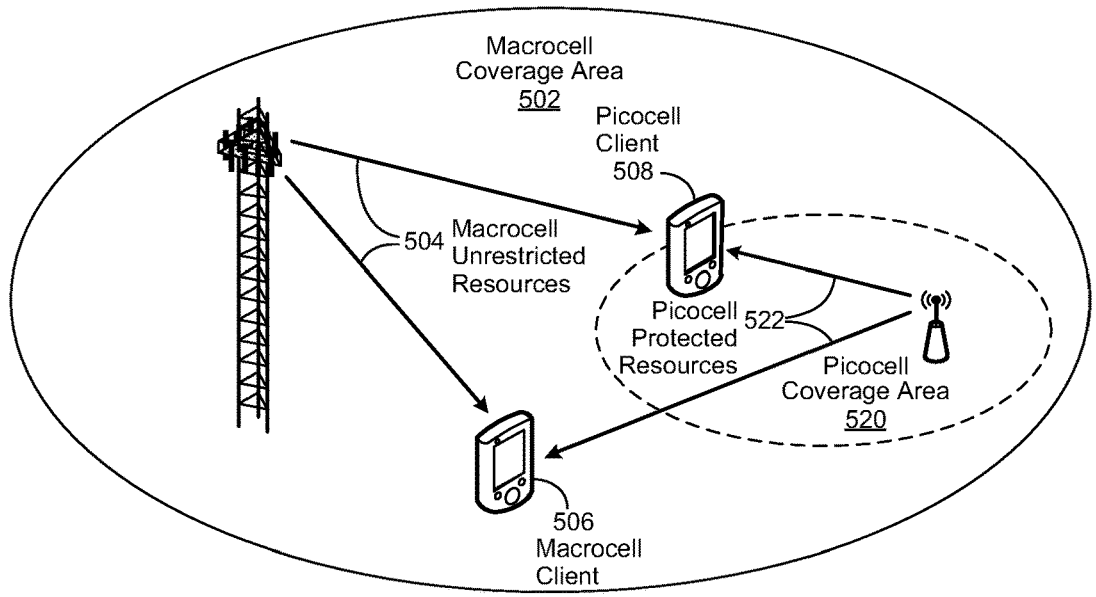
FIG. 5 is a generalized illustration of a wireless-enabled communications environment as implemented in accordance with an embodiment of the invention to reduce client node power consumption when performing channel monitoring operations corresponding to a macrocell and a picocell.

FIG. 5 is a generalized illustration of a wireless-enabled communications environment as implemented in accordance with an embodiment of the invention to reduce client node power consumption when performing channel monitoring operations corresponding to a macrocell and a picocell. In this embodiment, a macrocell coverage area ("macrocell") 502 comprises a picocell coverage area ("picocell") 520. As shown in FIG. 5, the client node device ("macro client") 506 uses unrestricted macrocell resources 504 to communicate within the macrocell 502. Likewise, the client node ("pico client") 508 may selectively use protected picocell resources 522 to communicate within the picocell 520, or alternatively, unrestricted macrocell resources 504. Accordingly, there is a need for reducing power consumption of a picocell client 508 and a macrocell client 506 when respectively performing channel monitoring operations corresponding to the picocell protected resources 522 and the macrocell unrestricted resources 504.

In various embodiments, interference conditions are encountered when the picocell client 508 is on the edge of the picocell 520, such as when the picocell 520 is used to offload traffic from the macrocell 502. In other embodiments, interference conditions are encountered when the macrocell client 506 which is not a member of the closed subscriber group of a femtocell is in close proximity to the femtocell. In these cases, the conventional use of enhanced inter-cell interference coordination (eICIC) may not be as effective as desired in mitigating control channel interference. As a result, enhanced co-channel interference management is necessary to allow such victim clients 506, 508 to remain connected to the serving nodes respectively servicing the macrocell 502 and the picocell 520.

Accordingly, a time-domain solution is typically implemented for mitigating the aforementioned interference. In various embodiments, in the case of macro-pico interference, a restricted resource set (e.g., a set of subframes) of a picocell is designated as a "protected" resource 522 under strong inter-cell interference. In this embodiment, interference is mitigated by the macrocell freeing up its resources corresponding to the picocell's protected resources. In various other embodiments, in the case of a macro-femto scenario, a restricted resource set is configured at a femto Enhanced Node B (eNB) to mitigate interference for the macro client 506.

Figure 6:
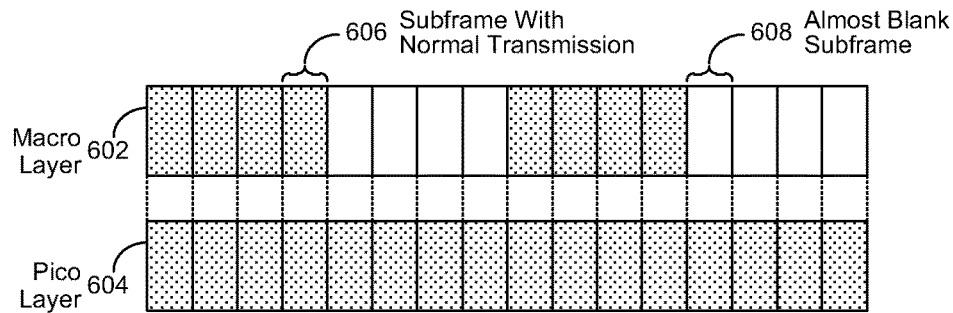
FIG. 6 is a simplified illustration of the implementation of Almost Blank Subframes (ABS) to reduce client node power consumption when performing channel monitoring operations corresponding to a macrocell and a picocell.

FIG. 6 is a simplified illustration of the implementation of Almost Blank Subframes (ABS) in accordance with an embodiment of the invention to reduce client node power consumption when performing channel monitoring operations corresponding to a macrocell and a picocell. Skilled practitioners of the art will be familiar with ABS, which is a technique adopted in 3GPP Rel-10 to mitigate interference encountered by picocell clients from a macrocell, and conversely, the interference encountered by macrocell clients from a femtocell. When ABS is implemented, in one embodiment, the control region and the data region are blanked on the macrocell in the case of mitigating macrocell-picocell interference and only the reference signal itself is transmitted. Conversely, the control region and the data region are blanked on the femtocell in the case of mitigating macrocell-femtocell interference.

Those of skill in the art will realize that if the Primary Synchronization Signal (PSS), Secondary Synchronization Signal (SSS), Physical Broadcast Channel (PBCH), System Information Block (SIB1), Paging, or Positioning Reference Signal (PRS) coincide with ABS, they are transmitted in the ABS, with associated Physical Downlink Control Channel (PDCCH) when SIB1 or Paging is transmitted. Likewise, the Common Reference Signal (CRS) is transmitted on ABS to avoid affecting 3GPP Rel-8/9 client node channel estimation and Radio Resource Management RRM, Radio Link Management (RLM) or Channel Quality Indicator (CQI) calculations. To further reduce the interference from CRS in a data region, ABS is typically configured as a Multimedia Broadcast over Single Frequency Network (MBSFN) subframe whenever possible. Skilled practitioners of the art will likewise be aware that subframe #0, #4, #5, and #9 cannot be MBSFN subframes due to PSS, SSS, PBCH, SIB1, or Paging.

Referring now to FIG. 6, ABS is implemented to mitigate interference between a macrocell and a picocell in a wireless-enabled communications environment. In this embodiment, the macro layer 602 of the macrocell comprises normal transmission subframes 606 that are muted by implementation of ABS 608 when the picocell uses the corresponding normal transmission subframes of the pico layer 604 to communicate with picocell edge clients. Accordingly, interference from the dominant interferer is reduced. During non-implementation of the ABS 608, the pico node typically schedules picocell center clients with strong signal power, which has relatively high tolerance to macrocell interference.

In various embodiments, three types of client nodes coexist within the previously described heterogeneous network environment: picocell center clients, picocell edge clients, and macrocell clients. In these and other embodiments, some pico clients will have stronger downlink received signal power from the macro cell (i.e., the interferer) than from the picocell (i.e., the serving cell), especially if range expansion is applied to enhance the picocell coverage. Accordingly, the percentage of picocell edge clients is likely greater than in a traditional homogeneous network environment. As a result, with more picocell edge clients existing in the system, it is also likely that a larger incidence of ABS would be used to serve those clients which are sensitive to the dominant interference from the macrocell. However, increasing the number of ABS has the negative affect of limiting the macrocell capacity.

In various embodiments, picocell edge clients may not be scheduled at the non-ABS subframes due to the high interference on the Physical Downlink Control Channel (PDCCH). In these and other embodiments, since ABS resources are limited, picocell center clients are scheduled at non-ABS as much as possible to save the limited ABS resources for those clients which need them the most. In various embodiments, one or more of three scheduling options are implemented within the picocell: 1) ABS-only; 2) non-ABS-only; and 3) both-ABS-and-non-ABS. In these various embodiments, there is a high possibility that picocell edge clients will be scheduled with option 1, picocell center clients will be scheduled with option 2, and those picocell clients with intermediate Signal to Interference plus-Noise Ratio (SINR) will be scheduled with option 3. For macrocell clients, there is only one scheduling option: non-ABS, as it is not possible to schedule a macrocell client during ABS.

From the foregoing, skilled practitioners of the art will realize that the consumption of battery resources may be reduced by classifying clients into different scheduling options at the picocell and macrocell. As an example, it would not be necessary to monitor PDCCH during non-ABS for picocell edge client if the client node would be scheduled only at ABS. Similarly, for picocell center clients, it would not be necessary to monitor PDCCH during ABS if the client node would be scheduled only at non-ABS. For macrocell clients, it would not be necessary to monitor PDCCH during ABS. By not monitoring PDCCH, the portion of the client node processing logic used to monitor the predetermined channel is temporarily powered-down and, therefore, power consumption of the client node's 202 power storage unit is reduced when the channel monitoring operations are ceased.

Figure 7:
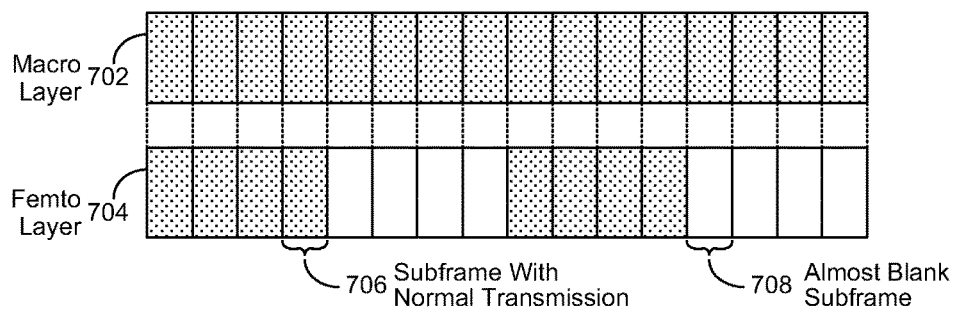
FIG. 7 is a simplified illustration of the implementation of ABS to reduce client node power consumption when performing channel monitoring operations corresponding to a macrocell and a femtocell.

FIG. 7 is a simplified illustration of the implementation of Almost Blank Subframe (ABS) in accordance with an embodiment of the invention to reduce client node power consumption when performing channel monitoring operations corresponding to a macrocell and a femtocell. In this embodiment, the femto layer 704 of the femtocell comprises normal transmission subframes 706 that are muted by implementation of ABS 708 when the macrocell uses the corresponding normal transmission subframes of the macro layer 702 to communicate with a macrocell client that is in close proximity to the femtocell. Accordingly, interference from the dominant interferer is reduced. However, it will be appreciated that macrocell and femtocell capacity is decreased as a result of reduced subframe resources with the introduction of ABS in a heterogeneous network environment. As a result, the ABS pattern requires appropriate configuration to provide optimum service quality and throughput to both pico/femto clients and macrocell clients alike.

The consumption of client node battery resources can also be reduced in a macro-femto co-channel implementation in which the femto clients would not need to monitor PDCCH during the ABS and the macro clients close to femtocells would not need to monitor PDCCH during the non-ABS if they are scheduled during ABS only. In this embodiment, the femto clients would need to monitor PDCCH of this subframe if the femto SIB1/paging is transmitted in an ABS.

Figure 8:
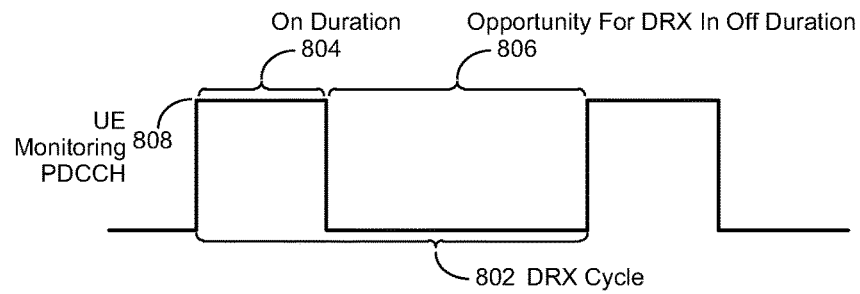
FIG. 8 is a simplified illustration of the monitoring a Physical Downlink Control Channel (PDCCH) during a Discontinuous Reception (DRX) channel cycle to reduce client node power consumption.

FIG. 8 is a simplified illustration of the monitoring of a Physical Downlink Control Channel (PDCCH) during a Discontinuous Reception (DRX) channel cycle as implemented in an embodiment of the invention to reduce client node power consumption. Skilled practitioners of the art will be aware that client node battery saving is currently enabled by DRX functionality in Evolved Universal Terrestrial Radio Access Network (E-UTRAN) implementations. In these implementations, the client node may be configured by Radio Resource Control (RRC) with a DRX functionality that controls the client node's PDCCH monitoring activity for the client node's Cell Radio Network Temporary Identifier (C-RNTI), Transmit Power Control (TPC)-Physical Uplink Control Channel (PUCCH)-Radio Network Temporary Identifier (RNTI), Transmit Power Control (TPC)-Physical Uplink Shared Channel (PUSCH)-Radio Network Temporary Identifier (RNTI), and Semi-Persistent Scheduling (SPS)-C-RNTI, if configured. Likewise, when in RRC_Connected mode, the client node is allowed to monitor the PDCCH discontinuously using the specified DRX operation if DRX is configured. Likewise, a DRX cycle 802 is defined within these implementations as a periodic repetition of the On Duration 804, followed by a possible period of inactivity. During the On Duration 804, the client node monitors 808 the PDCCH during the Off Duration 806, with the result that the client node may enter a sleep mode if no inactivity timer or retransmission timer is triggered.

As shown in FIG. 8, the DRX cycle 802 is configured as a periodic pattern. In this embodiment, the On Duration 804 timer, the DRX cycle 802, and other DRX values are controlled by the network to define the behavior of the client node DRX implementation. When a DRX cycle 802 is configured, the Evolved Node B (eNB) restricts downlink (DL)/uplink (UL) allocations to the client node within the active time if possible. The client node is not required to monitor 808 the PDCCH for DL/UL allocations during the DRX off duration. However, those of skill in the art will realize that the DRX cycle 802 does not reconcile with the ABS pattern used in Enhanced Inter-cell Interference Coordination (eICIC). Instead, as implemented in current systems, the ABS pattern is periodical with a 40 ms periodicity for Frequency Division Multiplex (FDD) systems.

Likewise, Radio Resource Control (RRC) signaling is used to notify the client node about the resource-specific Radio Link Management (RLM)/Radio Resource Management (RRM) measurement regarding the ABS pattern, while a bitmap pattern is used to indicate the ABS pattern of macrocell to picocell over X2 signaling. The ABS pattern can also be updated semi-statically to allow adjustments based on traffic loading conditions. In various embodiments, a variety of ABS patterns, including non-contiguous ABS patterns, may be provided. Due to the possible non-contiguous ABS pattern and the fixed 40 ms periodicity of the ABS pattern, those of skill in the art will realize that it is difficult to align the DRX cycle with the ABS pattern in order to reduce client node battery consumption. Furthermore, DRX is a complicated procedure consisting of various timers (e.g., inactivity timer, retransmission timer, etc.). Skilled practitioners of the art will likewise realize that it is not practical to configure DRX parameters to match the ABS pattern for the purpose of client node battery power savings given the complex nature of DRX operation.

Figure 9:
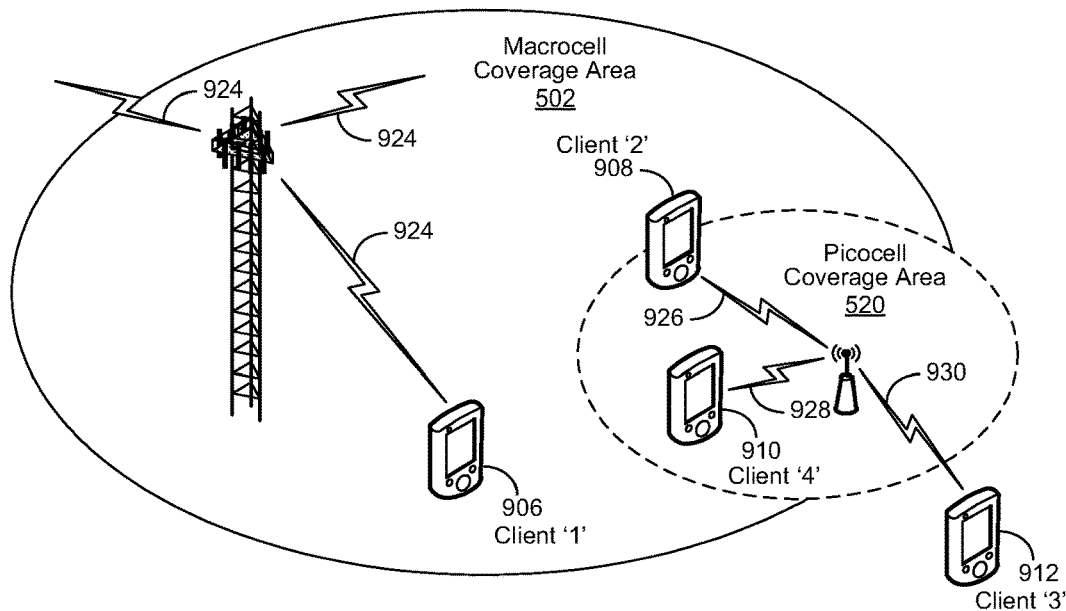
FIG. 9 is a generalized illustration of the implementation of ABS scheduling to reduce client node power consumption.

FIG. 9 is a generalized illustration of the implementation of Almost Blank Subframe (ABS) scheduling in accordance with embodiments of the invention to reduce client node power consumption. In these embodiments, a macrocell coverage area ("macrocell") 502 comprises a picocell coverage area ("picocell") 520. As shown in FIG. 9, client node '1' 906 primarily communicates within macrocell 502, while client node '2' 908 may communicate within macrocell 502, but instead, communicates within picocell 520 since it operates on its cell edge or extended cell edge. As likewise shown in FIG. 9, client node '4' 910 communicates primarily within the picocell 520, while client node '3' 912 is outside of the picocell 520 and as a result, may have lost communication. Accordingly, client node '1' 906 is referred herein as a "macro client," client node '2' 908 as a "picocell-edge-client," and client node '4' 910 as a "picocell-center-client." In this and other embodiments, the battery consumption of the client nodes '1' 906, '2' 908, '3' 912, and '4' 910 is reduced by implementing eICIC with various scheduling options.

In one embodiment, the client node is scheduled for possible allocation only at ABS ("only-ABS"), due to its sensitivity to macrocell interference, or alternatively, femtocell interference. In this embodiment, the client node '2' 908 (e.g., a picocell-edge-client) only monitors the Physical Downlink Control Channel (PDCCH) for possible allocation at ABS. In another embodiment, the client node '1' 906 (e.g., a macro client) may likewise implement the only-ABS scheduling if the macro client is in close proximity to femtocells. In certain of these embodiments, the client node '1' may not monitor PDCCH or perform blind decoding for the client node's Cell Radio Network Temporary Identifier (C-RNTI), Transmission Power Control (TPC)-Physical Uplink Control Channel (PUCCH)-Radio Network Temporary Identifier (RNTI), Transmission Power Control (TPC)-Physical Uplink Shared Channel (PUSCH)-Radio Network Temporary Identifier (RNTI), and Semi-Persistent-Scheduling (SPS) C-RNTI, if configured.

In one embodiment, the client node is only scheduled for possible allocation at non-ABS. In this embodiment, the non-ABS scheduling is applied to the client node '1' 906 (e.g., a macrocell client). In another embodiment, the non-ABS scheduling is applied to the client node '4' 910 (e.g., a picocell-center-client). Skilled practitioners of the art will realize that only scheduling possible allocations during non-ABS reduces client node batter consumption, and accordingly, this embodiment is advantageous when applied to the client node '1' 906 (e.g., a macro client). These same skilled practitioner will also appreciate that, due to limited ABS resources, it may also be desirable to schedule picocell-center-clients (e.g., client node '4' 910) at non-ABS and thus the ABS resources can be left to picocell edge clients (e.g., client node '2' 908) that cannot be scheduled at non-ABS resources. In another embodiment, the non-ABS scheduling option can be implemented with femto clients and macro clients (e.g., client node '1' 906) that are not within the coverage of femtocells.

In one embodiment, the client node is scheduled for possible allocation using both ABS and non-ABS. In this embodiment, the client node continuously monitors all the subframes, including ABS and non-ABS. In another embodiment, this scheduling option is implemented with picocell clients (e.g., client nodes '2' 908, '3' 912, and '4' 910) with intermediate Signal to Interference plus-Noise Ratio (SINR). For those client nodes, both-ABS-and-non-ABS is used for possible allocations. Likewise, different PDCCH aggregation level and Modulation and Coding Scheme (MCS) level may be used for the both-ABS-and-non-ABS scheduling. The picocell 520 can flexibly choose which subframe to schedule for those client nodes (e.g., client nodes '2' 908, '3' 912, and '4' 910), depending on the ABS resource availability, loading condition, Quality of Service (QoS) requirements, etc. If the client node (e.g., client nodes '2' 908, '3' 912, and '4' 910) is configured with this scheduling option, it may not save battery power since as it needs to monitor all the subframes. However, by adding this scheduling option, it allows the picocell 520 to flexibly assign resources to the client nodes (e.g., client nodes '2' 908, '3' 912, and '4' 910) such that the overall cell capacity can be improved and also the QoS of both a picocell-center (e.g., client node '4' 910) and a picocell-edge client node (e.g., client node '2' 908) can be satisfied. In yet another embodiment, the both-ABS-and-non-ABS scheduling option is applied to macrocell client nodes (e.g., client node '1' 906), that are not within the coverage of femtocells.

Referring now to FIG. 9, an example of ABS scheduling options in a macrocell 502 and a picocell 520 is illustrated. In this example, two ABS subframes are assigned per radio frame. Therefore, picocell edge client nodes (e.g., client node '2' 908) only needs to monitor 20% of the subframes, which equates to a power savings of approximately 80% in RRC_Connected mode for downlink reception. Conversely, macrocell client nodes (e.g., client node '1' 906) and pico-cell-center clients (e.g., client node '4' 910) will only monitor 80% of the non-ABS subframes, which equates of a power savings of approximately 20% for downlink reception. By defining the scheduling options in the heterogeneous macrocell 502 and picocell 520 environment, all client nodes (e.g., client nodes '2' 908, '3' 912, and '4' 910) could potentially benefit from the restricted subframes for possible allocation, despite of whether it is in a macrocell 502 or a picocell 520. Examples of such potential client node power saving with various ABS configurations are listed in Table 1.

TABLE 1

| Number of ABS Per Radio Frame | Battery Saving for Macro Clients/Pico-Center-Clients at DL Reception | Battery Saving for Picocell-Edge-Clients at DL Reception |
| --- | --- | --- |
| 2 | 20% | 80% |
| 4 | 40% | 60% |
| 6 | 60% | 40% |
| 8 | 80% | 20% |

Those of skill in the arts will realize that the scheduling options described herein are independent of the transmission of system information, paging information, and synchronization channel. As an example, if the client node is required to receive any of those channels on any subframes, it will wake up and continue to monitor the PDCCH/PDSCH regardless of the scheduling options defined above.

In various embodiments, the ABS pattern is signaled to both macrocell client nodes (e.g., client node '1' 906) and pico/femtocell client nodes (e.g., client nodes '2' 908, '3' 912, and '4' 910) either over broadcast signaling channel or dedicated signaling channels. In these and other embodiments, both the macrocell eNB and the pico/femtocell eNB signals the Scheduling Option Indicator (SOI) to the client node via the dedicated RRC signaling or the MAC control elements to enable client node battery savings. Accordingly, the SOI indicates the scheduling mode of the client node: ABS-only, non-ABS-only, and all subframes. In one embodiment, the SOI is 2 bits, as illustrated in Table 2:

TABLE 2

| 2-bit SOI Indication | |
| --- | --- |
| 00 | ABS Only |
| 01 | Non-ABS-Only |
| 10 | All Subframes |
| 11 | Reserved |

It will be appreciated that other mappings not included Table 2 are also possible. For example, '00' could mean "non-ABS-only." In another embodiment, the SOI could be a single bit, as illustrated in Table 3. The lack of a SOI indicator means the client node can be scheduled in all subframes.

TABLE 3

| 1-bit SOI Indication | |
| --- | --- |
| 0 | ABS Only |
| 1 | Non-ABS-Only |

In these various embodiments, the SOI indicator could be contained in any RRC messages transmitted from the eNB (macrocell or pico/femtocell) to the client node. For example, it could be contained in the RRCConnectionSetup message, RRCConnectionReconfiguration message, or RRCConnectionReestablishment message, etc. In particular, the SOI could be contained in any information elements (IE), such as IE RadioResourceConfigDedicated, IE MAC-MacConfig, or other IEs. In the following example, IE MAC-MainConfig is used, with the two bit SOI indicator shown in Table 2:

```
- - ASN1START
MAC-MainConfig ::=          SEQUENCE {
    ul-SCH-Config               SEQUENCE {
        maxHARQ-Tx                  ENUMERATED {
                                        n1, n2, n3, n5, n6, n7, n8,
                                        n10, n12, n16, n20, n24, n28
                                        spare2, spare1}
                                    OPTIONAL, - - Need ON
        periodicBSR-Timer           Enumerated {
                                        sf5, sf10, sf16, sf20, sf32,
                                        sf40, sf64, sf80, sf128,
                                        sf160, sf320, sf640, sf1280,
                                        sf2560, infinity, spare1}
                                    OPTIONAL, - - Need On
        retxBSR-Timer               ENUMERATED {
                                        sf320, sf640, sf1280, sf2560,
                                        sf5120, sf10240, spare2,
                                        spare1},
        ttiBundling                 BOOLEAN
    }                                   OPTIONAL, - - Need On
```

-continued

```
drx-Config                    DRX-Config           OPTIONAL, - - Need On
timeAlignmentTimerDedicated   TimeAlignmentTimer,
SchedulingOptionIndicator     INTEGER   (0..2),
phr-Config                    CHOICE {
   release                       NULL,
   setup                         SEQUENCE {
      periodicPHR-Timer              ENUMERATED  {sf10, sf20, sf50,
                                                  sf100, sf200,
                                                  sf500, sf1000,
                                                  infinty},
      prohibitPHR-Timer              ENUMERATED  {sf0, sf10, sf20,
                                                  sf50, sf100,
                                                  sf200, sf500,
                                                  sf1000},
      dl-PathlossChange              ENUMERATED  {dB1, dB3, dB6,
                                                  infinity}
   }                                              OPTIONAL, - - Need On
}
...,
[[ sr-ProhibitTimer-r9        INTEGER      (0..7)
                                                  OPTIONAL, - - Need On
   ]]
}
DRX-Config                    CHOICE {
   release                       NULL,
   setup                         SEQUENCE {
      onDurationTimer                ENUMERATED {
                                       psf1, psf2, psf3, psf4, psf5,
                                       psf6, psf8, psf10, psf20,
                                       psf30, psf40, psf 50, psf60,
                                       psf80, psf100, psf200},
      drx-InactivityTimer            ENUMERATED {
                                       psf1, psf2, psf3, psf4, psf5,
                                       psf6, psf8, psf10, psf20,
                                       psf30, psf40, psf 50, psf60,
                                       psf80, psf100, psf200, psf300,
                                       psf500, psf750, psf1280,
                                       psf1920, psf2560, spare10,
                                       spare9, spare8, spare7,
                                       spare6, spare5, spare4,
                                       spare3, spare2, spare1},
      drx-RetransmissionTimer        ENUMERATED {
                                       psf1, psf2, psf4, psf6, psf8,
                                       psf16, psf24, psf33},
      longDRX-SycleStartOffset       CHOICE  {
         SF10                           INTEGER (0..9),
         SF20                           INTEGER (0..19),
         SF32                           INTEGER (0..31),
         SF40                           INTEGER (0..39,
         SF64                           INTEGER (0..63,
         SF80                           INTEGER (0..79),
         SF128                          INTEGER (0..127),
         SF160                          INTEGER (0..159),
         SF256                          INTEGER (0..254),
         SF320                          INTEGER (0..319),
         SF512                          INTEGER (0..511),
         SF640                          INTEGER (0..639),
         SF1024                         INTEGER (0..1023),
         SF1280                         INTEGER (0..1279),
         SF2048                         INTEGER (0..2047),
         SF2560                         INTEGER (0..2559)
      }
      shortDRX                       SEQUENCE {
         shortDRX-Cycle                 ENUMERATED  {
                                          sf2, sf5, sf8, sf10, sf20,
                                          sf32, sf41, sf64, sf80, sf128,
                                          sf160, sf256, sf320, sf512,
                                          sf640},
         drxShortCycleTimer             INTEGER   (1..16)
      } OPTIONAL                                    -- Need OR
   }
}
-- ASN1STOP
```

Figure 10:
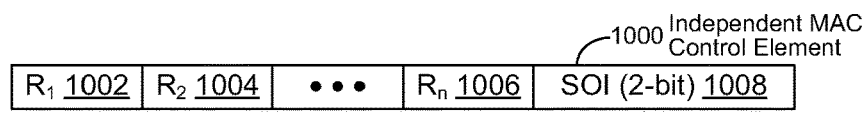
FIG. 10 is a simplified illustration of a Scheduling Option Indicator (SOI) transmitted as a MAC control element.

FIG. 10 is a simplified illustration of a Scheduling Option Indicator (SOI) transmitted as a MAC control element as implemented in accordance with an embodiment of the invention. In this embodiment, an independent MAC control element 1000 comprises reserved bits 'R$_1$' 1002, 'R$_2$' 1004 through 'R$_n$' 1006 and a two bit SOI 1008.

Figure 11:
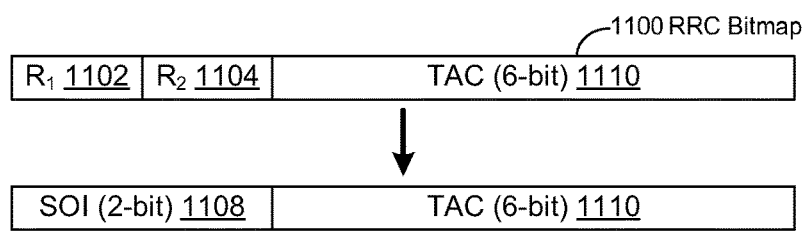
FIG. 11 is a simplified illustration of Radio Resource Control (RRC) signaling bitmap as implemented to indicate which ABS a client node should monitor via PDCCH.

FIG. 11 is a simplified illustration of using existing reserved bits in the Timing Advance Command (TAC) 1110

MAC Control Element (CE) to indicate which Almost Blank Subframes (ABS) a client node should monitor via Physical Downlink Control Channel (PDCCH). In this embodiment, macro/pico/femto eNBs indicate to the client node the subframes it will or will not need to monitor via a bitmap 1100. As shown in FIG. 11, the existing reserved bits in the TAC MAC CE '$R_1$' 1102 and '$R_2$' 1104 are mapped to a two bit Scheduling Option Indicator (SOI) 1108.

Skilled practitioners of the art will recognize that this and other embodiments are related to the implementation of ABS as described in greater detail herein. In these and other various embodiments, the signaling alternatives described in greater detail herein are applied to a restricted subframe set, which may be a subset of the ABS subframe set. In these various embodiments, ABS subframes could be exchanged with restricted subframes. Likewise, the restricted subframes may be a subset of the ABS, or may be the same as the ABS. For example, if a restricted subframe set '$X_s$' is a subset of the ABS set 'X', then the above described embodiments and signaling details could apply as well.

Skilled practitioners of the art will recognize that this approach provides flexibility, especially if the client nodes are in the coverage areas of multiple ABS patterns. For example, a macro client may be operating in an overlapped coverage area of multiple femtocells, with each femtocell having its own ABS pattern. To avoid femtocell interference, the macro client is scheduled during subframes that occur when all involved femtocells blank their transmissions. In this example, instead of sending multiple ABS patterns and SOI to the client node, it may be simpler to directly indicate to the client node the subframes that the client node needs or does not need to monitor PDCCH. A similar situation occurs if ABS is configured at both the macro and the pico/femto eNBs to increase the footprints of both layers.

From the foregoing, those of skill in the art will recognized that the invention enables reduction of client node power consumption in a heterogeneous wireless-enabled communications environment with the application of enhanced inter-cell interference coordination (eICIC). Likewise, ABS is adopted in current systems as the time-domain eICIC solution to mitigate macro-to-pico interference. By defining the client node scheduling into different modes, the client node is not required to monitor PDCCH for resource allocation in a subset of the subframes. Thus, the client node can enter sleep mode during those non-allocated subframes. By applying the proposed solution, both macro clients and pico/femtocell clients can reduce power consumption. As an example, if two ABS are configured in a heterogeneous macrocell and picocell wireless environment, about 20% power savings can be achieved for macrocell and picocell center clients in RRC-Connected mode. About 80% powers saving can be achieved for picocell edge clients. Although the percentage of client node power savings varies from the configuration of ABS, a majority of client nodes in the network could potentially benefit from the proposed scheme. From a signaling perspective, only a two bit indicator in the RRC signaling is required to notify the client node of its scheduling option. Hence, the signaling overhead is negligible, while significant client node battery savings can be realized throughout a heterogeneous wireless-enabled communications environment.

Although the described exemplary embodiments disclosed herein are described with reference to reducing client node power consumption in a heterogeneous wireless-enabled communications environment, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A client node, comprising:
   at least one processor; and
   a memory storing instructions, the instructions when executed by the at least one processor, causing the at least one processor to:
   receive a control signal comprising a downlink mode indicator, wherein the downlink mode indicator has two states, each state indicating a mode, wherein:
   a first mode indicating that the client node is scheduled only in one or more Almost Blank Subframes (ABSs) within ABS pattern data on a downlink channel; and
   a second mode indicating that the client node is scheduled only in one or more non-ABSs within the ABS pattern data on the downlink channel;
   wherein the client node is scheduled only in one or more ABSs within the ABS pattern data, and ceases monitoring non-ABSs within the ABS pattern data when the downlink mode indicator has a state indicating the first mode; and
   wherein the client node is scheduled only in one or more non-ABSs within the ABS pattern data, and ceases monitoring ABSs within the ABS pattern data when the downlink mode indicator has a state indicating the second mode.

2. The client node of claim 1, wherein the downlink mode indicator is signaled to the client node via a signaling message.

3. The client node of claim 1, wherein the downlink mode indicator is provided to the client node implicitly.

4. The client node of claim 1, wherein the client node is further provided with the Almost Blank Subframe (ABS) pattern data.

5. The client node of claim 4, wherein the ABS pattern data comprises ABS information.

6. The client node of claim 1, wherein said monitoring comprise monitoring of a Physical Downlink Control Channel (PDCCH).

7. The client node of claim 1, wherein the downlink mode indicator indicates a third mode indicating that the client node is scheduled in both ABS and non-ABS within the ABS pattern data.

8. The client node of claim 1, wherein the downlink mode indicator is signaled via a scheduling option indicator (SOI).

9. The client node of claim 8, wherein the SOI is communicated to the client node as a MAC Control element.

10. The client of claim 8, wherein the SOI is communicated to the client node in a Radio Resource Control (RRC) message.

11. A method for reducing power consumption of a client node, comprising:

receiving a control signal comprising a downlink mode indicator, wherein the downlink mode indicator has two states, each state indicating a mode, wherein:
- a first mode indicating that the client node is scheduled only in one or more Almost Blank Subframes (ABSs) within ABS pattern data on a downlink channel; and
- a second mode indicating that the client node is scheduled only in one or more non-ABSs within the ABS pattern data on the downlink channel;

wherein the client node is scheduled only in one or more ABSs within the ABS pattern data, and ceases monitoring non-ABSs within the ABS pattern data when the downlink mode indicator has a state indicating the first mode; and wherein the client node is scheduled only in one or more non-ABSs within the ABS pattern data, and ceases monitoring ABSs within the ABS pattern data when the downlink mode indicator has a state indicating the second mode.

12. The method of claim 11, wherein the downlink mode indicator is signaled to the client node via a signaling message.

13. The method of claim 11, wherein the downlink mode indicator is provided to the client node implicitly.

14. The method of claim 11, wherein the client node is further provided with the Almost Blank Subframe (ABS) pattern data.

15. The method of claim 14, wherein the ABS pattern data comprises ABS information.

16. The method of claim 11, wherein said monitoring comprise monitoring of a Physical Downlink Control Channel (PDCCH).

17. The method of claim 11, wherein the downlink mode indicator indicates a third mode indicating that the client node is scheduled in both ABS and non-ABS within said ABS pattern data.

18. The method of claim 11, wherein the downlink mode indicator is signaled via a scheduling option indicator (SOI).

19. The method of claim 18, wherein the SOI is communicated to the client node as a MAC Control element.

20. The method of claim 18, wherein the SOI is communicated to the client node in a Radio Resource Control (RRC) message.

* * * * *